L. O. LARSON.
LINE FASTENER.
APPLICATION FILED MAR. 3, 1921.

1,405,423. Patented Feb. 7, 1922.

Inventor
Lawrence O. Larson.

By
Geo. P. Kimmel, Attorney

UNITED STATES PATENT OFFICE.

LAWRENCE O. LARSON, OF MINNEAPOLIS, MINNESOTA.

LINE FASTENER.

1,405,423.　　　　Specification of Letters Patent.　　Patented Feb. 7, 1922.

Application filed March 3, 1921. Serial No. 449,592.

*To all whom it may concern:*

Be it known that I, LAWRENCE O. LARSON, a citizen of the United States, residing at Minneapolis, in the county of Hennepin and State of Minnesota, have invented certain new and useful Improvements in a Line Fastener, of which the following is a specification.

This invention relates to fasteners for clothes lines or other cables.

The object of the invention is to provide a simple and efficient device of this character which may be termed a self tying knotless fastener and which is adapted to be secured to a support in position so that the pulley constituting a part thereof will lie horizontally, a plurality of such fasteners being used mounted on suitable supports in the same plane and in the same position.

Another object is to provide a clothes line fastener of the pulley type which is mounted so as to provide for the throwing of a line around it without necessitating passage of the line between the pulley and a casing.

Another object is to provide such a fastener with means to permit a line to be drawn taut and held by the fastener without knotting the line.

Another object is to so construct such a fastener that the greater the strain exerted on the body or main portion of the line, the more securely will the line be secured to its support.

With these and other objects in view, the invention consists in certain novel features of construction as hereinafter shown and described and then specifically pointed out in the claims.

Figure 1:
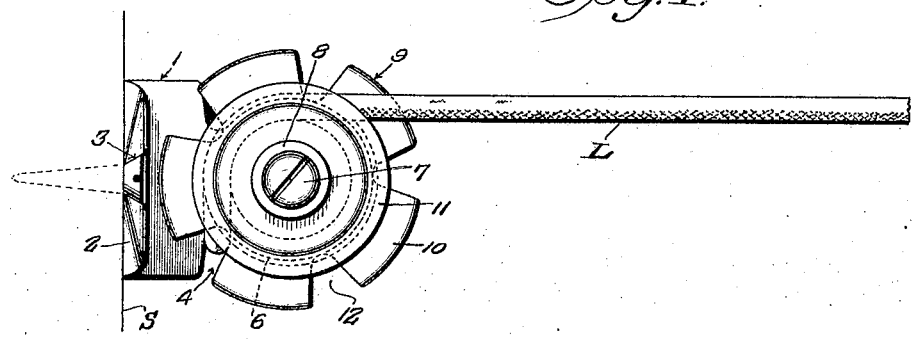
Figure 2:
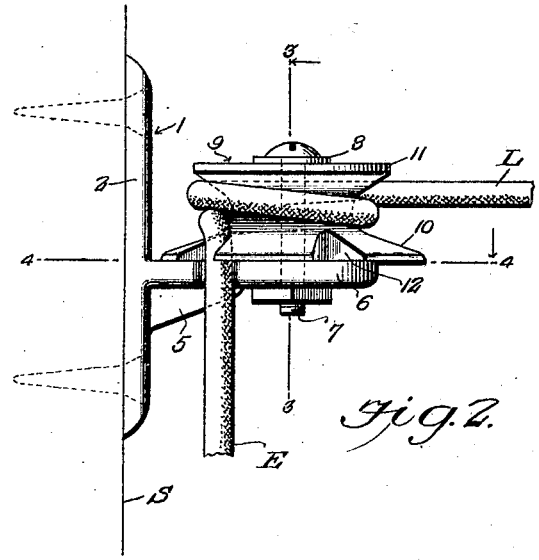
Figure 3:
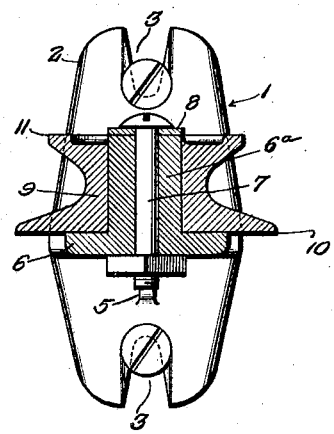
Figure 4:
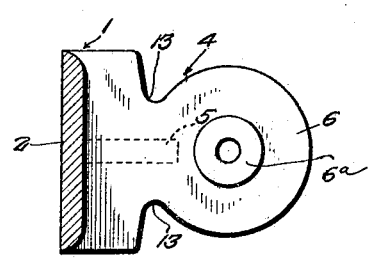

In the accompanying drawing:

Figure 1 represents a plan view of a fastener constructed in accordance with this invention shown applied, Figure 2 is a side elevation thereof, Figure 3 is a vertical section taken on the line 3—3 of Fig. 2, and Fig. 4 is a horizontal section taken on the line 4—4 of Fig. 2.

In the embodiment illustrated, the device constituting this invention comprises a substantially T-shaped cast metal bracket 1, the head 2 of which is made in the form of a plate having its opposed ends notched, as shown at 3 to receive fastening screws for attaching a bracket to a support which may be a post, the side of a building or any other fixed member.

The stem or shank 4, of the bracket 1, preferably located nearer one end of the head 2 than the other end has a strengthening rib or web 5 on its lower face connecting with the head of the bracket and preferably cast integral therewith. This shank or stem 4 has its free end made in the form of a centrally apertured disk 6 with a laterally extending sleeve $6^a$ surrounding said aperture on the side of the shank opposite to that having the rib 5 and is designed to receive a pulley 9 which is held in operative position by a bolt 7 on which is mounted between the free end of sleeve $6^a$ and the head of the bolt a washer 8. The sleeve $6^a$ is cast integral with the bracket member 4 and operates to take the strain exerted on the pulley thereby relieving the bolt 7 of such strain. The pulley 9 is peripherally grooved and its inner flange 10 is made wider than its outer flange 11, said inner flange 10 being arranged adjacent the plate or disk 6, as is shown clearly in Figs. 2 and 3. This flange 10 is provided with a plurality of V-shaped notches 12 in the periphery thereof, any desired number of which may be employed, five being here shown, and which are designed to receive the cable or line L to be fastened. These notches 12 cooperate with similarly shaped notches 13 formed at the inner end of the disk 6 in the shank 4 of the bracket, as is shown clearly in Fig. 4.

In the use of this improved fastener, the bracket 1, as shown in Figs. 1 and 2 is fastened with screws or other suitable fasteners to an upright support S, the screws passing through the notches 3 in the head of the bracket so that said bracket is mounted with its shank or stem 4 projecting laterally at right angles to the head and also to the support S. As is shown, it is of course so mounted that the pulley 9 will be on the upper face of said shank 4 and a line L to be fastened is passed completely around the periphery of the pulley and then additionally around a fraction of its circumference a second time thereby insuring stability and is tightened by means of pulling on the loose end E of the line which is then slipped into one of the notches 12 in the pulley flange 10 and into one of the notches 13 of the bracket stem or shank 4. Line L will then tighten up and force the pulley in a reversed direction catching the line between the pulley and the shank of the bracket, thereby securely fastening the line with the result that the greater the weight placed on the line, the more securely will the pulley hold.

From the above description it will be seen that the pulley 9 around which the line L is adapted to be wound requires no casing to support it, thereby avoiding the necessity of passing the end of the line between such a casing and the pulley and adapting said line to be thrown around the pulley instead, the pulley being mounted in a horizontal upright position.

The line L may be drawn from one bracket to another at a horizontal angle, and may be fastened at each bracket if desired by bringing the line under the bracket and inserting it in one of the notches 13 in the shank thereof. It will be obvious that this fastener requires that the line be wrapped completely around the pulley twice, or rather completely around it once and around a fraction of its circumference a second time, thereby insuring stability and making it truly self tying and not merely a slack adjuster.

This fastener may be cheaply constructed, easily applied and quickly and conveniently operated to secure the line.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:

1. A clothes line fastener comprising a bracket to be mounted on a support and having a laterally extending arm, a line receiving pulley mounted on one face of said arm, said pulley being uninclosed to adapt a line to be passed around it by throwing it over the pulley and having a flange positioned adjacent said arm, said flange and arm having cooperating V-shaped notches to grippingly secure a line wound on the pulley.

2. A clothes line fastener comprising a substantially T-shaped bracket, the head member of which is equipped with notches in its opposed end and a shank provided with a terminal disk, a pulley, rotatably mounted on said disk with the flange thereof adjacent the disk of greater diameter than the other flange, said wider flange being provided with a plurality of V-shaped notches in the periphery thereof, and said shank having a similarly shaped notch underlying the notched flange for co-operation therewith to secure a line in adjusted position.

In testimony whereof, I affix my signature hereto.

LAWRENCE O. LARSON.